PROCESS FOR COLD PLASTIC FORMING OF SPACED TOOTH-LIKE PROJECTIONS ON A RING OR SIMILARLY SHAPED MEMBER

[72] Inventors: Toshimi Ohnishi; Takamitsu Suziki, Akio Takahashi; Hiroshi Yagi; Shunichi Ohya; all of Aichi, Japan

[73] Assignee: Toyota Jidosha Kogyo Kabushiki Kaisha, 3, Toyoto-shi, Japan

[22] Filed: Aug. 14, 1970

[21] Appl. No.: 63,736

[52] U.S. Cl. .....................72/334, 29/159.2, 72/375
[51] Int. Cl. .........................B21d 28/00, B21d 53/26
[58] Field of Search........72/253, 343, 334, 326, 414, 72/412, 375, 359, 353; 29/159.2

[56] References Cited

UNITED STATES PATENTS

| | | | |
|---|---|---|---|
| 1,336,493 | 4/1920 | Tibbets | 29/159.2 |
| 637,653 | 11/1899 | Parish | 29/159.2 |
| 2,285,575 | 6/1942 | Elbertz | 29/159.2 |

*Primary Examiner*—Richard J. Herbst
*Assistant Examiner*—R. M. Rogers
*Attorney*—McGlew and Toren

[57] ABSTRACT

Spaced tooth-like projections are formed on the circumferential periphery of a ring-like body member by cold plastic forming operations carried out on an annular section made of a forgeable material which projects transversely from the body member. The annular section has a substantially rectangular cross-section with a pair of spaced transversely extending face surfaces. Initially, while the ring-like member is supported against movement, alternate flat bottomed indentations and chamfered surfaces are formed in a pressing step on one of the transversely extending face surfaces. Next, grooves are extruded from the annular section between the chamfered sections so that the chamfered sections form an end, and the side surfaces of the grooves form sides of the tooth-like projections. The extruded material is cut off and the sides of the grooves are tapered by a working operation performed from the other one of the transversely extending face surfaces for completing the formation of the tooth-like projections.

8 Claims, 37 Drawing Figures

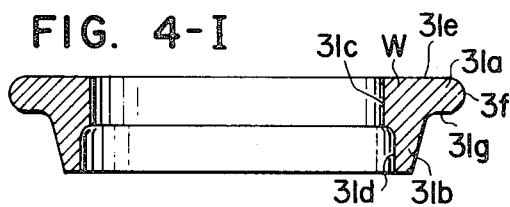
FIG. 4-I
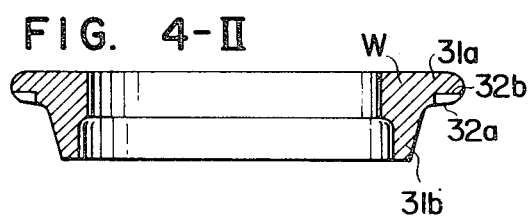
FIG. 4-II
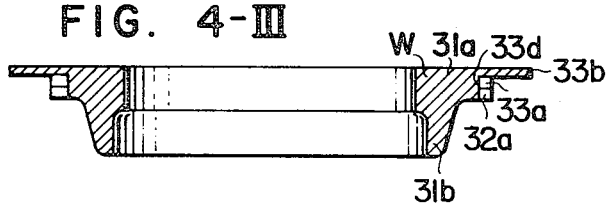
FIG. 4-III
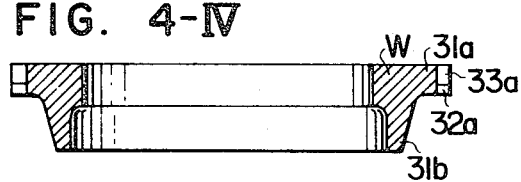
FIG. 4-IV
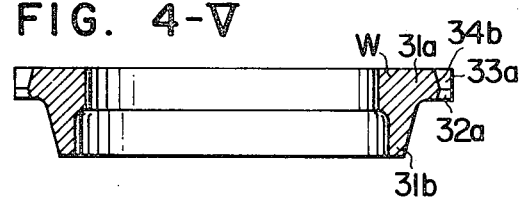
FIG. 4-V
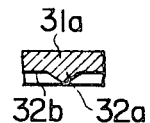
FIG. 4-IIa
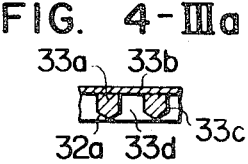
FIG. 4-IIIa
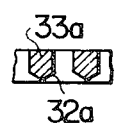
FIG. 4-IVa
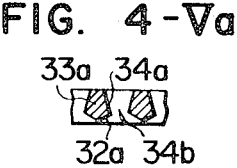
FIG. 4-Va

PROCESS FOR COLD PLASTIC FORMING OF SPACED TOOTH-LIKE PROJECTIONS ON A RING OR SIMILARLY SHAPED MEMBER

SUMMARY OF THE INVENTION

The present invention is directed to the formation of tooth-like projections on ring or disc-shaped bodies, and, more particularly, it is directed to a cold plastic forming operation for shaping such tooth-like projections which have a relatively complicated form such as the teeth or spline pieces in a gear clutch for a gear transmission.

In cold plastic forming operations the material to be treated is deformed plastically at a temperature below its crystallization point by various metal working operations, such as pressing, shearing, and extruding, and, as a result, uniform products with relatively high precision can be manufactured at low cost and with greater efficiency than in other forming processes. With such forming processes it is possible to obtain higher mechanical strength of the products, however, since such cold plastic forming involves a plurality of operations, if the operations are not properly performed the resulting product will not have the desired characteristics. In toothed wheels which transmit torque by rolling contact or sliding contact, teeth of an involute type are used to obtain a constant ratio of the angular speeds between intermeshed toothed wheels, and the teeth are formed by means of a rack cutter to provide them with the required involute shape. However, in such a tooth-forming operation, the teeth are provided only with a definite section or shape with respect to their width. As a result, teeth, such as the spline piece of a gear clutch, which have the guide chamfer of sleeve teeth and reverse tapered surfaces to prevent their displacement from engagement, are produced by cutting or by plastic forming operations. However, the formation of such teeth by cutting is disadvantageous since the material being formed must be treated with heat, such as by tempering, after the cutting operation and, as a result, the efficiency of production is low.

Therefore, a primary object of the present invention is to produce teeth or tooth-like projections of relatively complicated form on ring, disc or similarly shaped bodies by a cold plastic forming process in which the products have a high degree of precision and can be manufactured with great efficiency.

Another object of the present invention is to form the tooth-like projections on the ring-shaped bodies in a multi-step cold plastic forming operation by which the mechanical strength of the product formed is maintained at a high level and the projections are formed accurately to afford the requisite operating characteristics.

Still a further object of the present invention is to shape the tooth-like projections with a chamfered surface at one end and reversed tapered surfaces extending from the chamfered surfaces to the other end so that the tooth-like projections do not require any subsequent treatment, such as grinding and the like.

Therefore, in accordance with the present invention, tooth-like projections are formed on a ring or disc-shaped member in a multi-step cold plastic forming operation to provide a product, such as a gear clutch having spline pieces, of a relatively complicated shape for use in a gear transmission. Initially, an annular section made of a forgeable material is provided on the member so that it extends transversely of its axis. The annular section has a generally rectangular across-section of predetermined dimensions in which the tooth-like projections are to be formed. At the outset, alternating chamfered surfaces and flat bottomed indented surfaces are formed in one of the transversely extending surfaces of the annular section, such as by a pressing or forging step. In the next step of the operation, grooves are extruded from the annular section extending in the axial direction from the indented sections so that the side surfaces of the grooves form the opposite sides of the tooth-like projections extending from the chamfered sections. In this operation, the extruded material is directed radially from the transversely extending surface opposite the one in which the chamfer sections are formed. At this point the tooth-like projections have been partly formed with the extruded material forming a stop-like wall at the ends of the grooves between the tooth-like projections. These stop walls can be used to prevent any over-shifting of the gear clutch.

The extruded material is removed from the ends of the grooves in the annular section so that the grooves and tooth-like projections are formed for the complete dimension between the oppositely disposed transversely extending surfaces of the annular section. To complete the formation of the tooth-like projections and the grooves the surfaces of the teeth extending from the chamfer sections are tapered so that the opposite surfaces of the projections converge toward the opposite transversely extending surface of the annular section. As a result, the projections have a reverse tapered surface, as compared to the chamfered surfaces, to prevent any disengagement when the projections are placed in meshed engagement such as a gear clutch and a gear transmission.

In another embodiment of the process, in removing the extruded material a portion is retained on the ends of the projections opposite the chamfer sections to form radially extending stop parts for preventing over-shifting. When such stop parts are provided, the length of the teeth between the transversely extending surfaces must be adjusted to accommodate the addition of the stop parts.

Further, in providing the stop parts on the annular section, the extruded material can be punched about a diameter corresponding to the addendum circle of the tooth-like projections to form the stop parts at the ends of the grooves between the projections. When such stop parts are provided, a die plate is provided for shaping the reversed tapered surfaces of the projections by means of radially adjustable projections which extend into the grooves. In this manner the stop parts can be retained at the end of the grooves while the requisite tapered surfaces are provided within the grooves between the projections.

The various features of novelty which characterize the invention are pointed out with particularity in the claims annexed to and forming a part of this specification. For a better understanding of the invention, its operating advantages and specific objects attained by its uses, reference should be had to the accompanying drawings and descriptive matter in which there are illustrated preferred embodiments of the invention.

BRIEF DESCRIPTION OF THE DRAWINGS

In the drawing

FIGS. 4–I to 4–V are axially extending cross-sectional views of a ring-shaped member illustrating the steps of the process in accordance with the present invention for forming tooth-like projections on the exterior circumferential periphery of the member;

FIGS. 4–IIa to 4–Va are partial side views of the tooth-like projections formed in FIGS. 4–II to 4–V, respectively;

FIG. 6b is an axially extending partial view of a portion of the apparatus shown in FIG. 6a;

FIG. 6c is a partial transverse view of the apparatus shown in FIG. 6a;

FIG. 7b is a partial transverse view of the apparatus shown in FIG. 7a;

FIG. 8b is a partial longitudinal section illustrating a part of the apparatus shown in FIG. 8a;

FIG. 8c is a partial transverse view of the apparatus shown in FIG. 8a;

FIG. 9b is a partial side view illustrating the tooth-like projections extending from the circumferential periphery of the ring-shaped member shown in FIG. 9a;

FIG. 10b is a cross-sectional view of the ring-shaped member shown in FIG. 10a;

FIG. 11b is a partial side view of the tooth-like projections formed on the ring-shaped member of FIG. 11a;

FIG. 12b is a partial side view showing the tooth-like projection formed on the ring-shaped member in FIG. 12a;

DETAILED DESCRIPTION OF THE INVENTION

Figure 1:
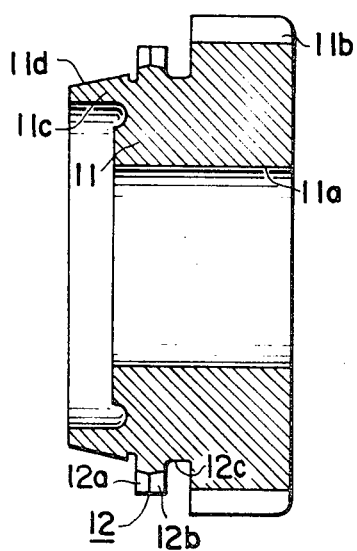
FIG. 1 is an axially extending cross-sectional view of a driven toothed wheel manufactured in accordance with a conventional process.

In FIG. 1 a driven toothed wheel or an intermediate toothed wheel 11 of a type used in conventional gear devices is shown. This wheel has a centrally arranged axially extending hole 11a for a shaft, and a series of axially extending teeth 11b are formed on the circumferential periphery of the wheel. Extending axially from the portion of the wheel containing the teeth 11b is an elongated part 11c on which a spline 12 is formed. The outer peripheral surface of the elongated part 11c extending from the spline 12 has a frustoconical shape, and a synchronizer ring, not illustrated in the figure, is fitted loosely on this surface. The spline 12, as viewed in FIG. 1, has chamfers 12a on the left hand side of the spline and spline teeth 12b with reversed tapered surfaces on the right hand side extending from the chamfers to prevent the disengagement of the spline when it is positioned in meshed engagement. The chamfers 12a ensure, as is well known, the engagement within the internal toothed spline of a clutch sleeve, not illustrated in the drawing. In the toothed wheel 11, the spline 12 is formed in a main part of the body, the chamfers 12a and the spline teeth 12b are formed by cutting and therefore escape grooves 12c are required to facilitate the formation of the spline and the protection of the tool edge. Accordingly, the axial length of the tooth wheel is increased and it is disadvantageous for the construction of the gear. Furthermore, in the cutting operation for the formation of the spline it is necessary to heat treat the wheel which increases its cost.

Figure 2:
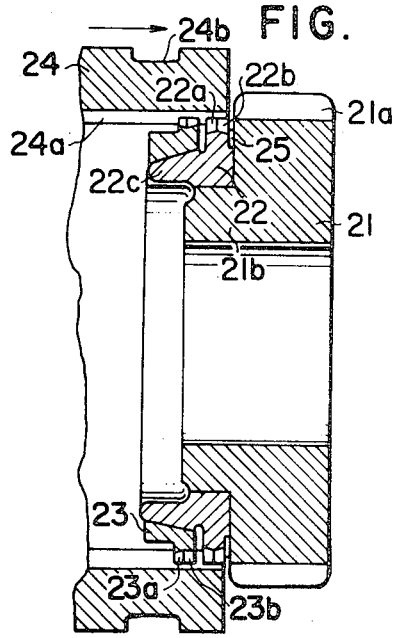
FIG. 2 is an axially extending cross-sectional view of a toothed wheel formed in accordance with the present invention, and positioned within a clutch sleeve.

Therefore, in some cases, as illustrated in FIG. 2, a spline member 22 is formed as a separate part of a toothed wheel 21 and it is secured on an axially extending part 21b of the wheel. The spline member can be secured by welding or other means. On the outer periphery of the toothed wheel, spaced axially from the spline member 22, a series of teeth 21a are formed. The spline member itself is provided with chamfer surfaces 22a, spline teeth 22b, and conically shaped extension 22c extending axially from the portion bearing the chamfer surfaces and the spline teeth, and at the base of the spline teeth adjacent the toothed wheel a stop ring 25 is provided for the prevention of over shifting. Further, a synchronizer ring 23 is fitted loosely on the conical extension 22c. The outer periphery of the synchronizer ring has chamfers 23a and spline teeth 23b. Arranged concentrically about the spline member 22 and the synchronizer ring 23 is a clutch sleeve 24 which has a plurality of inner spline teeth 24a on its inner surface, and on its outer surface 24b the clutch sleeve engages the end of a clutch operating arm, not shown in the drawing. The spline teeth 24a on the interior of the sleeve 24 are always engaged with an output toothed wheel, not shown in the drawing, and the sleeve 24 is shifted in the direction of the arrow so that the output toothed wheel is engaged with the toothed wheel 21 through the spline body 22. The synchronizer ring allows the engagement of the sleeve 24 with the toothed wheel 21 without any speed difference between the two, the speed differential is absorbed by means of frictional contact between the conical surfaces on the synchronizer ring and the spline member.

Figure 3A:
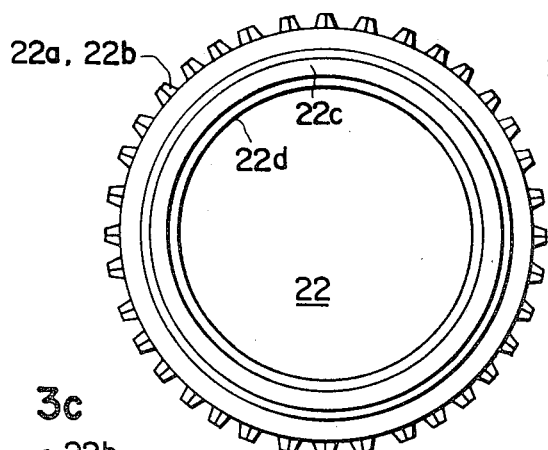
FIGS. 3a, 3b and 3c are a front view, an axially extending cross-sectional view, and a partial side view, respectively, of a gear member formed in accordance with the present invention for providing spline pieces or tooth-like projections.
Figure 3B:
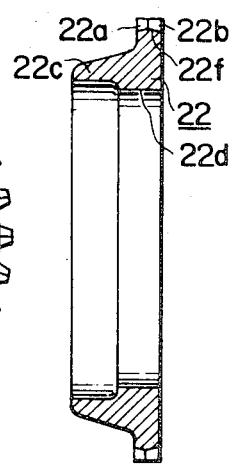
Figure 3C:
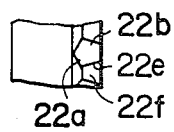

The present invention is directed to a cold plastic forming operation for producing separate spline bodies 22 as described above and a detailed construction of a spline body 22 is illustrated in FIGS. 3a and 3b. Similar reference numerals are used as in FIG. 2, and the outer peripheral surface of the spline member 22 has a multiplicity of spline teeth 22b arranged in equal pitch. The spline member 22 has a centrally arranged opening 22d for securing it onto an extended boss portion of the toothed wheel. Each of the tooth-like projections formed on the outer circumferential periphery of the spline member has oppositely sloping chamfer surfaces 22a which form a triangularly shaped leading edge for the spline member as it enters the spline sleeve and reverse tapered surfaces 22e extend from the edges of the chamfer surfaces to the opposite ends of the tooth-like projections. The reverse tapered surfaces 22e are provided to prevent disengagement of the spline at its rear surface. As viewed from the side in FIG. 3c each of the tooth-like projections on the spline member has a generally pentagonal shape.

In FIGS. 4–I to 4–V and 4–IIa to 4–Va the various steps carried out in effecting the cold plastic forming of the spline member is shown. Initially, as shown in FIG. 4–I, a ring-shaped body W is provided with an annular section 31a which extends transversely outwardly on the outer circumferential periphery of the ring and has a pair of oppositely directed transversely extending surfaces on which the cold plastic forming steps are carried out in forming the tooth-like projections. The annular section 31a extends axially from one of the end surfaces of the body W and the remaining outer periphery of the body forms a conical extension 31b. The annular section 31a is formed from a forgeable material, such as carbon steel, forgeable cast iron, alloy steel and the like by cold plastic forming or cutting or similar operations. A fitting hole 31c extends axially from the end surface of the body W containing the annular section 31a for a portion of the axial length of the body, and for its remaining length a slightly larger escape hole 31d is provided which is necessary for assembling operations. The annular section 31a is defined in the axial direction by a pair of transversely extending end surfaces 31e, 31g which face away from one another. The outer circumferential periphery of the annular section is shown in FIG. 4–I as a rounded surface 3f, however, the surface 3f need not be rounded and may have a cylindrical shape. Accordingly, the annular section in which the tooth-like projections are to be formed as a generally rectangular section as viewed in FIG 4–I if the surface 3f is cylindrical rather than rounded.

For purposes of description the formation of the body W with the annular section 31a, as shown in FIG. 4–I, will be designated the first step of the process.

Figure 5A:
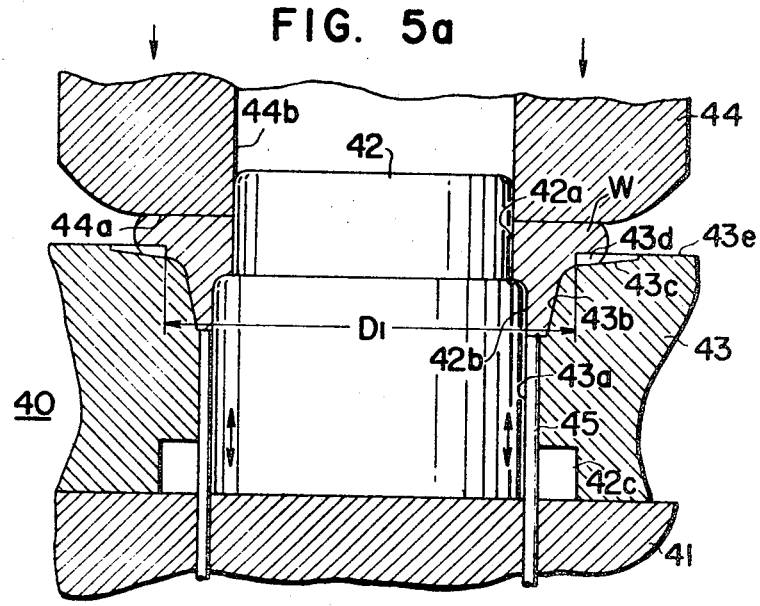
FIG. 5a is an axially extending cross-sectional view of an apparatus for forming the portion of the tooth-like projections as shown in FIG. 4–II.
Figure 5B:
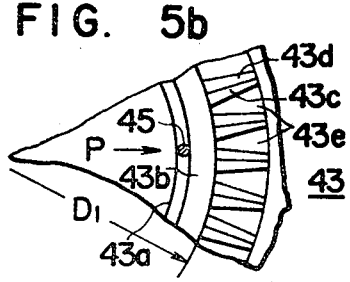
FIG. 5b is a partial transverse view of a portion of the apparatus shown in FIG. 5a for forming that portion of the tooth-like projections as exhibited in FIG. 4–II.
Figure 5C:
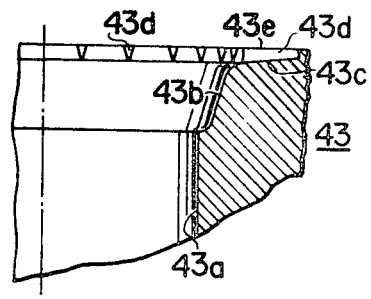
FIG. 5c is an axially extending view, partly in section, of the part of the apparatus of FIG. 5a which is illustrated in FIG. 5b.
Figure 5D:
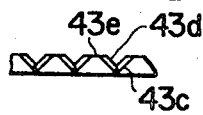
FIG. 5d is a side view of the grooved portion of the member shown in FIGS. 5b and 5c.

In the second step chamfer surfaces 32a are formed in the transversely extending end surface 31g of the body W by means of a chamfer forming apparatus 40 which is illustrated in FIGS. 5a to 5d. The chamfer forming apparatus 40 comprises a support member 41, a cylindrically shaped metal core 42 mounted on the support member 41, a die plate 43 which is also mounted on the support member and laterally encloses a part of the core 42, a cylindrical punch 44 provided about the upper end of the core and knock out rods 45 which extend upwardly through the support member and the die plate 43 so that the punch 44 and the rods 45 can be moved in the upward and downward direction in a predetermined order, by means not shown. As indicated in FIG. 5a the body W, from which the spline wheel is formed, is positioned about the core 42 with its lower surface supported on the die plate 43 and with the punch 44 contacting its upper surface, that is the transversely extending surface 31e. The core 42 has an upper smaller diameter part 42a which receives the fitting hole 31c of the body W. The larger diameter escape hole 31d of the body W fits in contact about the lower larger diameter part 42b of the core. The core 42 also has a part 42c at its base for receiving the parts used in the working operation.

The die plate 43 has an axially extending internal opening 43a which is arranged in contacting engagement with the larger diameter part 42b of the core and a conically shaped axially extending opening 43b extends upwardly from the opening 43a and corresponds to the elongated conically shaped extension 31b of the body W. At its upper end, the die plate 43 has a transversely extending flat end surface 43e which has an inner diameter $D_1$ and the plane of this surface is disposed perpendicularly to the axis of the apparatus 40. The circumferentially extending and radially inner part of the end surface 43e, that is the part extending outwardly from the diameter $D_1$ is provided with grooves 43d formed into the surface 43e with the side surfaces of the grooves converging inwardly as they extend outwardly from the diameter $D_1$. The grooves have a somewhat triangular sectional appearance. In addition, the grooves 43d have sloping base surfaces 43c which slopes downwardly to the point at which the grooves contact the diameter $D_1$. From the diameter $D_1$, the die plate curves into the conically shaped surface of the opening 43b. As viewed in FIG. 5c the grooves have a V-shaped section with a decreasing depth as they extend outwardly from the diameter $D_1$. The punch 44 has a transversely extending pressing surface 44a which is disposed perpendicularly to the axis of the apparatus and its cylindrically shaped inner opening 44b has a diameter which corresponds to that of the smaller diameter part 42a of the core 42.

In the second step of the operation, the body W is inserted about the core 42 as shown in FIG. 5a and its transversely extending end surface 31e is in contact with the pressing surface 44a of the punch 44. In carrying out this step the punch 44 is forced downwardly in the direction of the arrows shown in FIG. 5a, by means of a press, not illustrated in the drawing, while the other or lower transversely extending end surface 31g of the annular section 31a of the body W is supported against the upper end surface 43e of the die plate 43. The punch forces the lower transversely extending end surface 31g of the annular section 31a into the grooves 43d formed in the upper end surface 43e of the die plate. As a result, the chamfer surfaces 32a are formed in the end surface 31g of the annular section and in addition between the chamfer surfaces 32a flat bottomed indentations 32b are formed corresponding to the surface 43e located between the grooves 43d. Accordingly, the chamfer surfaces are formed by the grooves 43d and slope both in the circumferential and the radial directions due to the configuration of these grooves. After the formation of the chamfer surfaces 32a which form the first or lower portions of the tooth-like projections, the punch 44 is removed and the body W is removed by means of the knock out rods 45 which are displaced upwardly by ejector pins, not shown. The body W is removed from between the core and the die plate and is ready for the next step of the cold plastic forming operation.

Figure 6A:
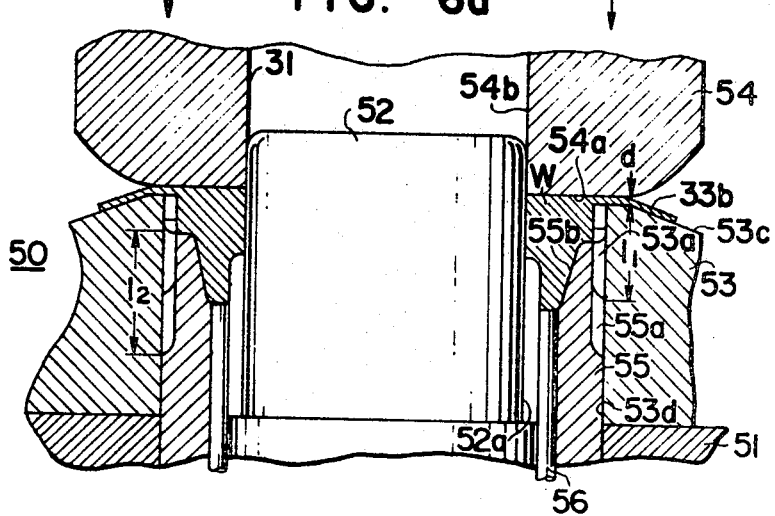
FIG. 6a is an axially extending cross-sectional view of apparatus for forming a portion of the cold plastic forming process of the present invention.
Figure 6B:
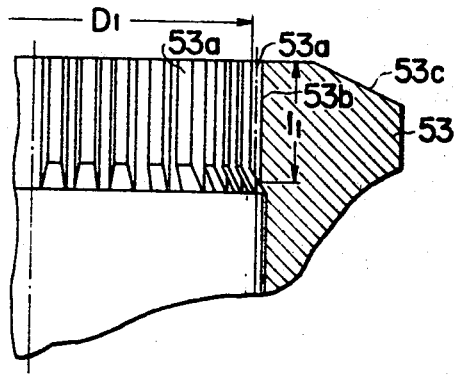
Figure 6C:
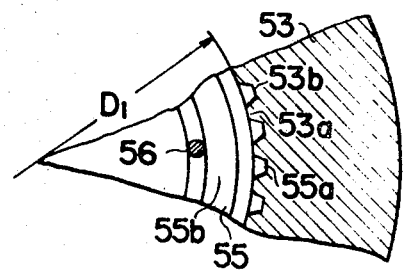

In FIG. 6a, an extruding apparatus 50 is shown for forming the side surfaces of the tooth-like projections extending upwardly from the chamfer surfaces as indicated in FIG. 4–III. The extruding apparatus 50 comprises a support member 51, a cylindrically shaped core 52, a die plate 53 positioned on the support member 51 and disposed concentrically about and spaced outwardly from the core. Further, the apparatus 50 includes a punch 54 which is disposed about and in contact with the upper end of the core 52, an auxiliary die plate 55 located inwardly from the die plate 53, and knock out rods 56 which extend upwardly between the core 52 and the auxiliary die plate 55. The core 52 has a cylindrically shaped surface 52a, however, it can also be equipped with a part having a larger diameter in the same fashion as the core 42 of the apparatus 40. The die plate 53 is annular in shape and has a multiplicity of axially extending spline teeth 53a formed in its inner surface for extruding the tooth-like projections in the body W. The teeth 53a have an axial dimension of $l_1$ extending downwardly from the upper surface 53c of the die plate. The radially inner part of the upper surface 53 is flat while its radially outer part has a conical shape sloping downwardly from flat part. This conical slope provided on the upper surface permits the material extruded in this step to easily escape outwardly during the forming operation. Between the teeth 53a axially extending bottom parts 53b are formed.

The punch 54 has a lower surface 54a extending perpendicularly to the axis of the apparatus and a hole 54b having a diameter so that the surface of the hole engages the peripheral surface 52a of the core 52. The auxiliary die plate fits within the opening 53d of the die plate and axially extending spline teeth 55a are formed on the exterior surface of the auxiliary die plate which fit into the bottom parts 53b of the grooves between the teeth 53a on the die plate. The radially inner surface of the auxiliary die plate 55 has a conically shaped surface 55b which corresponds to the conically shaped projecting surface 31b on the body W. The teeth 55a on the auxiliary die plate have an axial length $l_2$ and grooves are formed at their upper surfaces to receive the chamfer surfaces previously formed on the lower end surfaces 31g of the body W. Though shown separately in FIG. 6a, the die plate 53 and the auxiliary die plate 55 could be formed as a single member. However, by forming these two members as separate pieces the formation of the teeth 53a is easier and, in addition, the arrangement affords the ability to change the breadth of the tooth-like projections by the suitable arrangement of the auxiliary die plate relative to the die plate. The body W is assembled into the apparatus 50, shown in FIG. 6a, so that it is positioned with its conical projection 31b directed downwardly and contacting the upper inwardly facing surface of the auxiliary die plate 55. The punch 54 contacts the upper transversely extending surface 31e of the body and forces it downwardly in the direction of the teeth 53a and 55a. In the assembled position the grooves at the upper ends of the teeth 55a of the auxiliary die plate enclose the chamfer surfaces 32a which were formed on the lower transversely extending surface of the body W in the previous step. Since the grooves at the upper ends of the spline teeth 55a are positioned below the chamfer surfaces the spline teeth 53a on the die plate 53 are positioned exactly for extruding the material from between the tooth-like projections to be formed. Initially as the punch 54 pushes the body W downwardly, the spline teeth 53a cut into the material of the body and the tooth-like projections are extruded. Accordingly, the spline teeth 33a, note FIG. 4–III and 4–IIIa extend upwardly from the ends of the chamfered surfaces 32a spaced from the apex of such chamfered surfaces. In this step the side walls 33c of the teeth 33a are in parallel relationship and the bottom surface of the grooves between the teeth are also displaced in parallel relationship with the axis of the body. During this step, the material extruded moves radially outwardly from the body W as shown in FIG. 6a between the upper end surface 53c of the die plate and the lower surface 54a of the punch 54 and forms the extruded wall 33b. The downward pressure of the punch is maintained until the thickness of the extruded wall 33b reaches the value of d and then the downward pressure is discontinued. Subsequently, the knock out rods 56 are pushed upwardly by means of an ejector pin, not illustrated, and the partially worked body W is displaced from the core 52, the die plate 53, and the auxiliary die plate 55.

In some cases the auxiliary die plate 55 can be used for removing the extruded body W in place of the knock out rods 56. When the diameter of the addendum circle of the teeth 53a, which perform the extruding operation, has a diameter equal to the inner diameter $D_1$ of the radially inner surface of the bottom part 32b between the chamfer surfaces, the bottom part 33d of the tooth-like projection is formed successively from the radially inner surface of the bottom part 32b.

As shown in FIG. 6a, the extruded wall 33b is left in position by the apparatus 50 because the body might be broken before the extruded wall is removed by the punch and this possible breakage is avoided by stopping the downward pressing action of the punch when the dimension $d$ is reached between the lower surface 54a of the punch and the upper surface 53c of the die plate. The extruded wall 33b, left at the completion of the step illustrated by FIG. 4–III, can be used as a stop wall for protection from over-shifting. The formation of flat end surfaces on the teeth 53a results in a shearing of the body W in the cold plastic forming operation and, as a result, good finished tooth surfaces cannot be obtained. Hence, it is desirable for the end surfaces of the teeth 53a to be provided with a triangularly shaped chamfer surface for the proper application of the shearing and pressing steps.

Figure 7A:
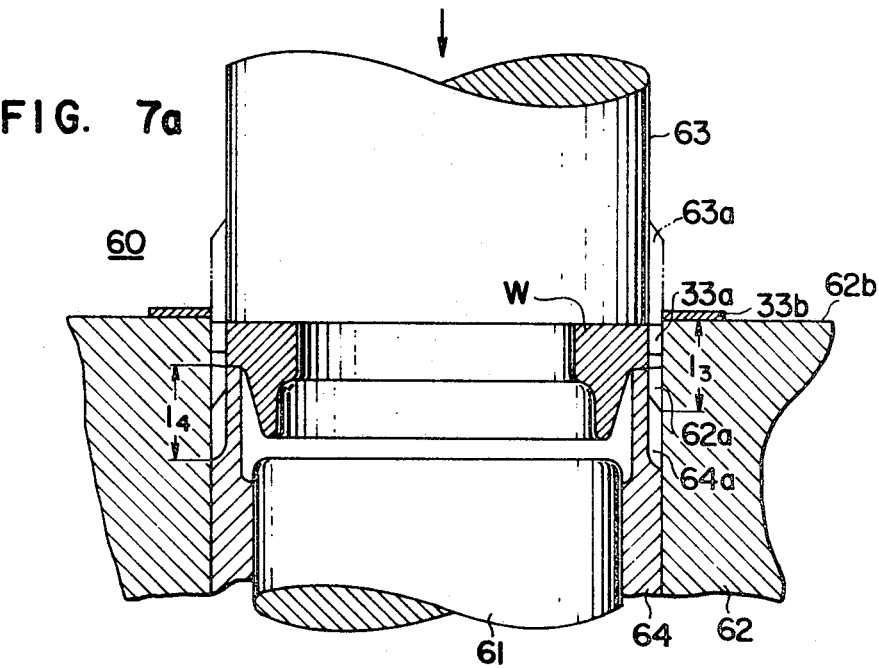
FIG. 7a is an axially extending cross-sectional view of an apparatus for forming a portion of the cold plastic forming operation of the present invention.

The body W with the extruded wall 33b extending radially outwardly from its circumferential periphery is placed in the punching device 60, as illustrated in FIG. 7a, for effecting the next step of the cold plastic forming operation. The device 60 is composed of a metal core 61, a punching die plate 62, a punch 63 coaxial with the core and an auxiliary die plate 64 positioned concentrically about the core and inwardly relative to the die plate. Because of its position between the die plate and the core, the auxiliary die plate 64 can be moved upwardly and downwardly. Further, the punch 63 is arranged to be moved downwardly in the direction of the arrow shown in FIG. 7a for directing the body W downwardly toward the core 61.

Figure 7B:
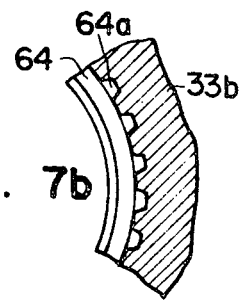

Similar to the arrangement of the apparatus 50, shown in FIG. 6a, the inner cylindrically shaped surface of the die plate 62 and the outwardly facing surface of the auxiliary die plate 64 which face each other, have spline teeth 62a and 64a, respectively, which are in engagement with each other. The tooth-like projections on the body W are guided to the spline teeth 62a of the die plate 62. The spline teeth 62a have a length $l_3$ extending downwardly from the upper end surface 62b of the die plate 62, and the spline teeth 64a have a length $l_4$ extending downwardly from the upper end surface of the auxiliary die plate 64. By exerting a downward pressure on the punch 63, the lower surface of the extruded wall 33b of the body W contacts the upper surface 62b of the die plate and the extruded wall is punched from the body W as is illustrated in FIG. 7 b. The portion of the extruded wall 33b located at the upper ends of the tooth-like projections 33a remain after the extruded wall 33b has been sheared off from the body W. Accordingly, the body W, as illustrated in FIG. 4–IV is obtained. The punch 63, as shown in FIG. 7a is cylindrically shaped and has the same diameter as the addendum circle of the spline teeth 62a on the die plate 62, however, it is preferable that the punch be provided with spline cutters 63a on its outer surface, as is illustrated in chain line, each of the cutters 63a is coincident with a spline tooth 64a on the auxiliary die plate 64 to effect the desired punched section.

Figure 8A:
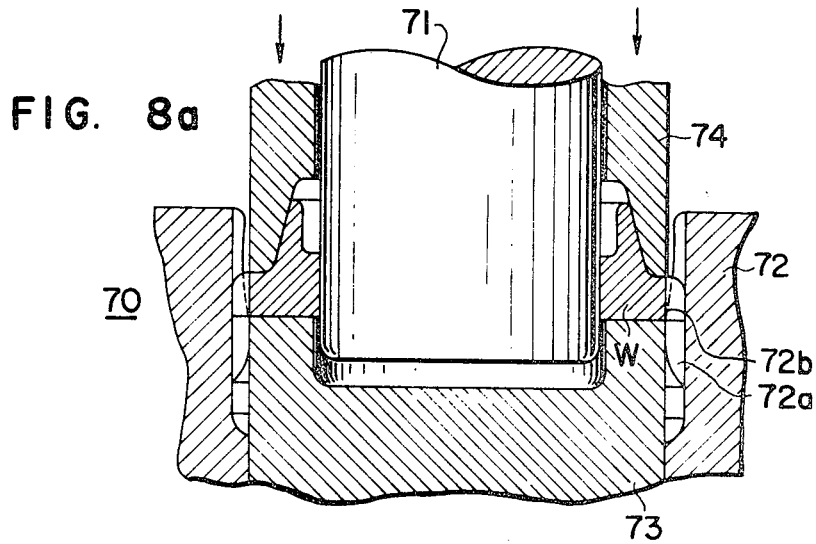
FIG. 8a is an axially extending cross-sectional view of an apparatus for forming a portion of the cold plastic forming operation of the present invention.
Figure 8B:
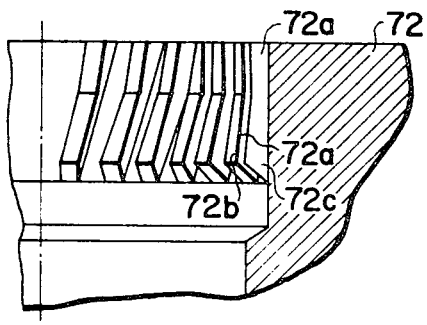
Figure 8C:
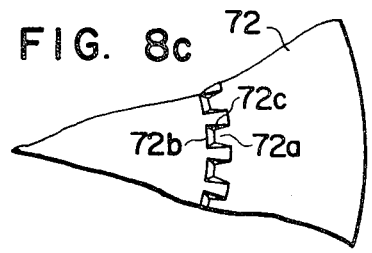

To provide the body W with the proper reversed tapered configuration of the tooth-like projections 33a, a taper forming apparatus is used, as shown in FIG. 8a. The apparatus 70 is made up of a metal core 71, a die plate 72, a knock out piston 73 and a cylindrical punch 74. The core may be formed as a body or in combination with either the piston 73 or the punch 74. The die plate has an opening therethrough coaxial with the core 71 and spaced radially outwardly from the surface of the core. The inner surface of the opening through the die plate has specially tapered teeth 72a uniformly distributed about its surface. Each end surface 72b and side surface 72c of the teeth 72a are tapered as is illustrated in FIGS. 8a, 8b and 8c. The pitch and number of the teeth 72a is the same as those of the tooth-like projections on the body W. As distinguished from the other working steps performed on the body W, in this step its flat transversely extending end surface 31e faces downwardly. Initially the body W is inserted into the opening in the die plate 72 and is pressed downwardly by means of the punch 74 which fits concentrically about the core 71. As the body W is forced downwardly the side surfaces of the tooth-like projections 33a which had been disposed in parallel relationship are given a reverse tapered configuration 34a and the bottom or base of the groove between the tooth-like projections is similarly given a reverse tapered configuration 34b, note FIGS. 4–V and 4–Va. Accordingly, the tooth-like projections extending outwardly from the circumferential periphery of the annular section 31a of the body W are completed in a multi-step cold plastic forming operation in a selected order of steps so that the body W can be worked without any breakage and strong tooth-like projections are provided.

In the embodiment formed by the process steps just described, no stop pieces are provided at the ends of the tooth-like projections for the prevention of over shift, that is at the ends of the projections opposite the chamfered surfaces which are initially formed in the working operation. However, such stop pieces may be provided by changing the manner in which the body W is worked.

Figure 9A:
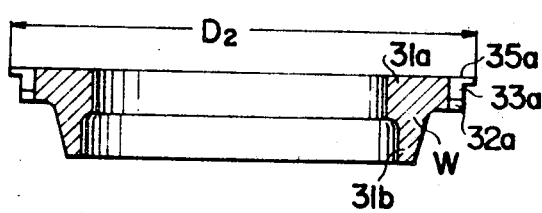
FIG. 9a is an axially extending cross-sectional view of a ring-shaped member formed in accordance with the present invention.
Figure 9B:
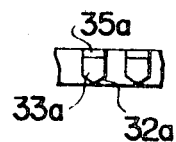

For instance, FIGS. 9a and 9b illustrate the body W after a step similar to that shown in FIG. 4–IV where the extruded wall 33b is cut so that a stop piece 35a is formed at the end of each of the tooth-like projections 33a. With the stop piece 35a on the body W it is placed in the taper forming apparatus 70 of FIG. 8a, and the requisite reverse tapered surface is provided for the prevention of the displacement of the body.

Figure 10A:
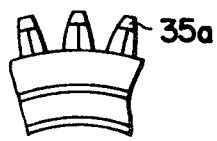
FIG. 10a is a partial top view of a ring-shaped member with tooth-like projections formed in accordance with the present invention.
Figure 10B:
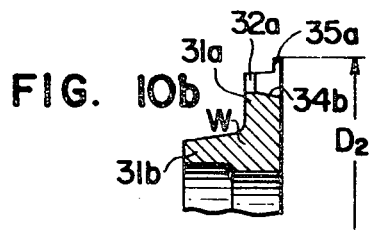
Figure 10C:
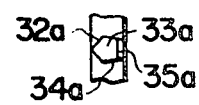
FIG. 10c is a partial side view of the tooth-like projections formed on the outer periphery of the ring-shaped member shown in FIGS. 10a and 10b.

In some cases, the stop piece is provided as indicated on the body W and the body can be worked in accordance with the previously described steps. FIGS. 10a to 10c illustrate different views of a body formed according to such steps. When providing such stop pieces on the body W it is necessary to enlarge its outside diameter $D_2$ of the addendum circle of the tooth-like projections by a cutting allowance.

Figure 11A:
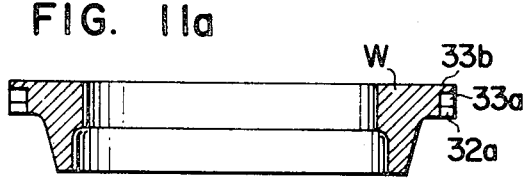
FIG 11a is an axially extending cross-sectional view of a ring-shaped member being formed in accordance with the present invention.
Figure 11B:
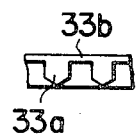
Figure 12B:
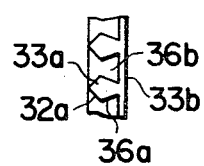
Figure 12A:
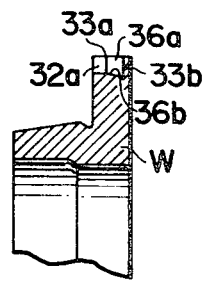
FIG. 12a is a partial axially extending cross-sectional view of a ring-shaped member with tooth-like projections formed in accordance with the present invention.
Figure 13B:
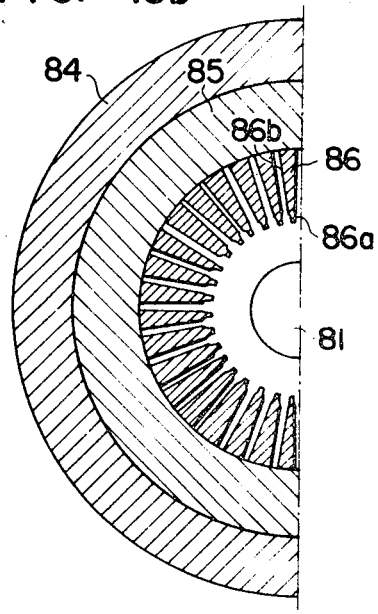
FIG. 13b is a transverse cross-sectional view of the apparatus illustrated in FIG. 13a illustrating the portion of the apparatus used in tapering the surfaces of the tooth-like projections.
Figure 13A:
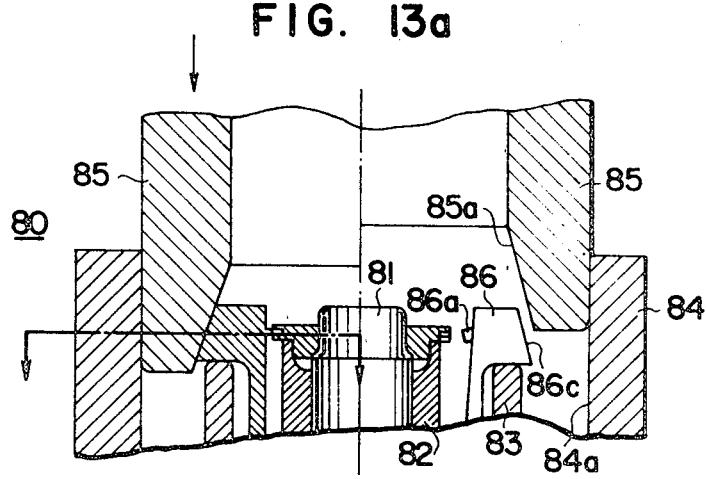
FIG. 13a is an axially extending cross-sectional view of an apparatus for forming the ring-shaped member with the tooth-like projections shown in FIGS. 12a and 12b.

In FIGS. 11a and b, 12a and b, and 13a and b, another embodiment of the process according to the present invention is illustrated for the formation of stop walls or pieces to prevent over shifting. In this embodiment of the process the extruded wall 33b, as illustrated in FIG. 4–III is utilized as the stop wall. In this process, the extruded wall 33b is punched by means of a well-known punching press with a circular shape having a diameter the same as that of the addendum circle of the tooth-like projections 33a and the portion of the extruded wall 33b inwardly of the addendum circle remains on the body W. To provide the reverse tapered surfaces 36a on the side surfaces or walls of the tooth-like projections 33a and the reverse tapered surface 36b on the base surface of the grooves between the projections 33a, as illustrated in FIGS. 12a and 12b, a taper forming device 80, as illustrated in FIG. 13a and 13b is utilized.

The device 80 is made up of a metal core 81, a knock out sleeve 82 concentrically disposed about the core 81, a supporting ring 83 spaced outwardly from the sleeve 82, a guide cylinder 84 concentrically disposed and spaced outwardly from the supporting ring 83, a piston 85 arranged to fit within the interior of the guide cylinder 84, and a collet shaped die plate 86 positioned inwardly from the supporting ring 83 and arranged to be contacted by the piston 85 during the working operation. The sleeve 82 is arranged to be moved upwardly and downwardly by means of an ejector pin, not illustrated. The piston 85 is also arranged to be moved upwardly and downwardly and is operated by means of a press, not shown. The die plate 86 is a sleeve-like body having a multiplicity of inwardly projecting protuberances 86a formed on its inner surface which are used in working the body W and a multiplicity of radially extending slits 86b are formed upwardly through the die plate positioned between the protuberances 86a. Further, on its radially outer surface the die plate has a conical surface 86c which is arranged to contact a similarly shaped conical surface 85a formed in the opening at the lower end of the piston 85a. The protuberances 86a are spaced to correspond with the spacing of the reversed tapered surfaces 36 a, 36b on the body W as shown in FIGS. 12a and 12b. The die plate 86 is arranged so that it can be passed over the body to be worked and then compressed inwardly so that the protuberances 86a can form the desired reversed tapered surfaces. In performing such a step, the piston 85 is pushed downwardly in the direction of the arrow shown in FIG. 13a, and the conical inner surface 85a at its lower end contacts the conically shaped outer periphery 86c of the die plate and the die plate reduces the dimensions of its body at the upper end and the protuberances 86a are inserted into the corresponding lower part of the body W being worked. The radial pressure on the die plate is increased in accordance with the contacting engagement of the conically shaped surfaces and, as a result, the desired plastic forming can be achieved. In carrying out the process of the present invention to form the tooth-like projections with chamfer surfaces the steps illustrated by FIGS. 4–I, 4–II, and 4–IIIx are necessary and, especially because the extruded wall 33b is left after the completion of the step shown in FIG. 4–III, the end parts of the tooth-like projections are formed without breakage. Additionally, by following the steps of the cold plastic forming indicated above, the strength of the tooth-like projections can be increased. Since in each of the steps described, the operation entails the displacement of a press or piston in the axial direction of the body being worked, each step can be completed by a single pressing operation of the press or piston. In carrying out the process from the point shown in FIG. 4–III, the reverse tapered surfaces and the stop pieces or stop wall can be formed, and since careful consideration has been given to the increase in strength of the tooth-like projections during the plastic forming steps, the requisite strength of the stop pieces can be maintained, though cutting is used for forming the stop piece.

What is claimed is:

1. Process for cold plastic forming of spaced tooth-like projections on the circumferential periphery of a ring, disc, or similarly shaped member comprising the steps of providing an annular section made of a forgeable material projecting from the body of the member transversely of its axis, the annular section having a generally rectangular cross-section of predetermined dimensions and the annular section defined on two sides by two spaced surfaces extending transversely of the axis, supporting the member against displacement and exerting a pressing action against one of the transversely extending surfaces and forming in the one of the transversely extending surfaces alternating indented sections and chamfered sections with the indented sections having flat bottoms generally parallel with and spaced from the one of the transversely extending surfaces and the chamfered section having a pair of surfaces each extending from an indented section and meeting in an apex in the plane of the one of the transversely extending surfaces, extruding grooves which extend in the axial direction of the member from the annular section which grooves extend from the indented sections and are located between the chamfered sections with the side walls of the grooves extending inwardly into the annular section forming extensions in the axial direction of the member from the ends of the chamfered sections which contacted the indented sections so that the chamfered sections and the side walls of the grooves define one end surface and two side surfaces of a tooth-like projection, and working the annular section for forming the other end surface of the tooth-like projection for providing a multiplicity of cold formed tooth-like projections in the annular section about the circumferential periphery of the member.

2. Process, according to claim 1, characterized therein by extruding the material displaced in forming the grooves for moving it in the radial direction from the other one of the transversely extending surfaces of the annular section.

3. Process, according to claim 1, wherein the step of working the annular section for forming the other end surfaces comprises the steps of cutting off the extruded material from the grooves for providing a continuation of the grooves to the other transversely extending end surface of the tooth-like projections and shaping the sides of the grooves in converging relationship from the ends of the chamfered sections spaced from the one of the transversely extending surfaces to the other one of the transversely extending surfaces so that the oppositely disposed sides of the tooth-like projections are in converging relationship from the chamfered sections thereof to the other one of the transversely extending surfaces.

4. Process, as set forth in claim 3, including shaping the bottom surfaces of the grooves between the tooth-like projections to slope inwardly into the annular section away from the circumferential periphery thereof from the ends of the chamfered sections spaced from the one of the transversely extending surfaces to the other one of the transversely extending surfaces.

5. A process, as set forth in claim 6, characterized therein by shaping the bottom surface of the grooves between the tooth-like projections to slope inwardly into the annular section away from the circumferential periphery of the annular section from the ends of the chamfered sections spaced from the one of the transversely extending surfaces to the stop member at the other one of the transversely extending surfaces.

6. Process for cold plastic forming of spaced tooth-like projections on the circumferential periphery of a ring, disc, or similarly shaped member comprising the steps of providing an annular section made of a forgeable material projecting from the body of the member transversely of its axis, the annular section having a generally rectangular cross-section of predetermined dimensions and the annular section defined on two sides by two spaced surfaces extending transversely of the axis, supporting the member against displacement and exerting a pressing action against one of the transversely extending surfaces and forming in the one of the transversely extending surfaces alternating indented sections and chamfered sections with the indented sections having flat bottoms generally parallel with and spaced from the one of the transversely extending surfaces and the chamfered section having a pair of surfaces each extending from an indented section and meeting in an apex in the plane of the one of the transversely extending surfaces, extruding grooves which extend in the axial direction of the member from the annular section which grooves extend from the indented sections and are located between the chamfered sections with the side walls of the grooves extending inwardly into the annular section forming extensions in the axial direction of the member from the ends of the chamfered sections and the side walls of the grooves define one end surface and two side surfaces of a tooth-like projection, and working the annular section for forming the other end surface of the tooth-like projection for providing a multiplicity of cold formed tooth-like projections in the annular section about the circumferential periphery of the member; extruding the material displaced in forming the grooves for moving it in the radial direction from the other one of the transversely extending surfaces of the annular section; cutting off the extruded material at the ends of the grooves opposite the one of the transversely extending surfaces and retaining the extruded material on the other one of the transversely extending surfaces opposite the chamfered sections, and forming the retained extruded material as a stop member for preventing over-shifting.

7. A process for cold plastic forming of tooth-like projections on the periphery of an annular section made of a forgeable material projecting from the body and having a generally rectangular cross-section of predetermined dimensions, using die plates formed with specific forming surfaces, comprising forcing the die plate against an end surface of the annular section to form a chamfer projection in the end surface of the annular section, forcing a second die plate having axially extending spline teeth formed in the surface thereof against the end surface of the annular section to extrude grooves which extend in the axial direction of the member and are located between the chamfered surfaces whereby spline teeth are formed extending axially from the ends of the chamfered surfaces spaced from the apex thereof, extruding an end wall, punching to remove the end wall in a manner that the portion of the extruded wall located at the ends of the tooth-like projections remain, and forcing a die plate which has in its inner surface specially tapered teeth each having a tapered end surface and tapered side surfaces on the annular section from the opposite side to the chamfer projections to form reverse tapered configurations for the prevention of disengagement.

8. A process according to claim 7, including cutting a tooth top of worked ring parts, the end surface opposite to the chamfer projections being left, and forming on the end surface stop pieces for prevention of shift.

* * * * *